United States Patent [19]

Ikeda et al.

[11] Patent Number: 5,440,096

[45] Date of Patent: Aug. 8, 1995

[54] WELDING PROCESS WITH DELAYED APPLICATION OF FULL CURRENT UNTIL AFTER START OF ARC

[75] Inventors: Nobukazu Ikeda; Hiroshi Morokoshi; Akihiro Morimoto, all of Osaka, Japan

[73] Assignee: Masako Kiyohara, Kumamoto, Japan

[21] Appl. No.: 270,578

[22] Filed: Jul. 5, 1994

[30] Foreign Application Priority Data

Jul. 5, 1993 [JP] Japan .................................. 5-165365

[51] Int. Cl.⁶ ................................................ B23K 9/06
[52] U.S. Cl. .................................... 219/130.5; 219/61
[58] Field of Search .................... 219/60 A, 61, 130.5, 219/130.4

[56] References Cited

U.S. PATENT DOCUMENTS

| | | | |
|---|---|---|---|
| 3,108,181 | 10/1963 | Miller | 219/130.5 |
| 3,536,879 | 10/1970 | Hartsell, Jr. et al. | 219/60 A |
| 3,689,734 | 9/1972 | Burley et al. | 219/130.5 |

*Primary Examiner*—Clifford C. Shaw
*Attorney, Agent, or Firm*—Griffin, Butler Whisenhunt & Kurtossy

[57] ABSTRACT

In an arc welding process for welding pipes used to convey high purity gas, dispersion of particles into the pipes during welding is reduced by discharging an inert back shielding gas into one end of one pipe and holding the welding current at less than the normal welding current for a specified interval after the start of arc, the welding current thereafter being increased to its normal level.

4 Claims, 3 Drawing Sheets

WELDING PROCESS WITH DELAYED APPLICATION OF FULL CURRENT UNTIL AFTER START OF ARC

FIELD OF THE INVENTION

The present invention relates to a process for arc welding pipes which convey extremely high purity gas, and more particularly to a pipe welding process which causes fewer particles of foreign material to be introduced into the pipes as they are welded.

BACKGROUND OF THE INVENTION

In semiconductor manufacturing plants and other installations requiring extremely high purity gas it is conventional to use electropolished stainless steel (SUS 316L) pipes. Non-welded fitting type or union joints of special construction are frequently used to join the pipes. However, non-welded joints are subject to gas leakage and piping using non-welded joints is extremely expensive. Therefore, in high purity gas piping systems it is conventional to make pipe connections by automatic butt welding by so-called TIG welding, or by automatic welding processes using special welding joints or collars.

In systems conveying very high purity gases, the mechanical strength of welding joints is a major concern. In addition, the welds should not serve as a source of contamination or contaminating particles. Furthermore, the inner surface of the weld joint should be smooth with minimum surface irregularity so as to enable easy formation of a corrosion resistant passive film on the inner surface of the joint. Japanese patent application no. 3-216158 discloses a welding method which nearly completely prevents the generation of particles at the weld joint. In that method, a back shielding inert gas such as argon is discharged into one of the two pipes being welded while an end of the other pipe is kept open. By adjusting the flow rate of the back shielding gas, the internal pressure of the pipes is raised so that any particles formed during the welding process are directed outwardly of the weld site rather than into the pipes. In a conventional welding process in which no back shielding gas is used, several thousand particles on the order of $0.1\mu$ or more in size may be released into the piping during welding but when a back shielding gas is used the number of particles released may be reduced to less than a few score.

In the welding process using back shielding high purity gas the internal pressure in the pipes being welded must be held to a specified value by allowing the back shielding gas to flow into the pipes at a specified rate. If the internal pressure cannot be maintained then the number of particles entering the pipes increases greatly. Thus, the use of back shielding gas may be of limited value in certain situations such as, for example, where the welding is carried out near a semiconductor manufacturing apparatus so that the increase in pressure in the pipes by the back shielding gas is restricted, or where the discharge of a large volume of back shielding gas is restricted. Under these conditions it is difficult to sufficiently reduce the number of particles entering the pipes.

By conducting dust generating tests during arc welding of pipes, we have determined that in the case of butt welding a large number of particles enter the pipes within the first 1 to 2 seconds after the welding arc is initiated. On the order of several thousand particles larger than 1 $\mu$m may enter the pipes during this interval. Even when the pipe butt sections and the welding head inside the welder are kept clean and the arc and back shielding gases are highly filtered to remove particles, several hundred particles may enter the pipes during the first two seconds after the arc is started.

The dust generating tests indicate that the particles are generated as the result of two phenomena which occur substantially simultaneously. First, at the start of arcing the plasma flow associated with generation of the arc blows a large number of particles up into the welding head. Secondly, solidification shrinkage of the surface of molten metal generated at the start of arcing pulls the arc-starting section of the joint groove thus producing a clearance on the side opposite to the arc-starting section.

SUMMARY OF THE INVENTION

An object of the invention is to provide a method of welding pipes which avoid the problems discussed above.

Another object of the present invention is to provide a method of welding pipes so that a minimum number of particles are introduced into the pipes during the welding process.

A further object of the invention is to provide a method of welding pipes which greatly reduces the number of particles entering the pipes even when there is a restriction on increasing the pressure inside the pipes by a back shielding gas or a restriction on the discharge of a large volume of back shielding gas.

According to the invention, arc welding of two pipes is accomplished by a method which comprises discharging a back shielding gas into an end of one pipe, initiating an arc with a welding current of reduced magnitude, bringing the pipes into an abutting relationship at a welding site, holding the welding current at the reduced magnitude for a predetermined period of time, and, after the predetermined time has elapsed, increasing the welding current to its normal welding magnitude. The reduced magnitude of the welding current is such that no fusion of the pipe material takes place at arc start-up. The predetermined time for maintaining the reduced welding current is chosen such that the reduced welding current is maintained until after the force of plasma flow, generated at the start of arcing, has subsided, and may be on the order of one to two seconds.

Other objects, features and advantages of the invention will become obvious upon consideration of the following description and the accompanying drawings.

DETAILED DESCRIPTION OF THE INVENTION

Figure 1:
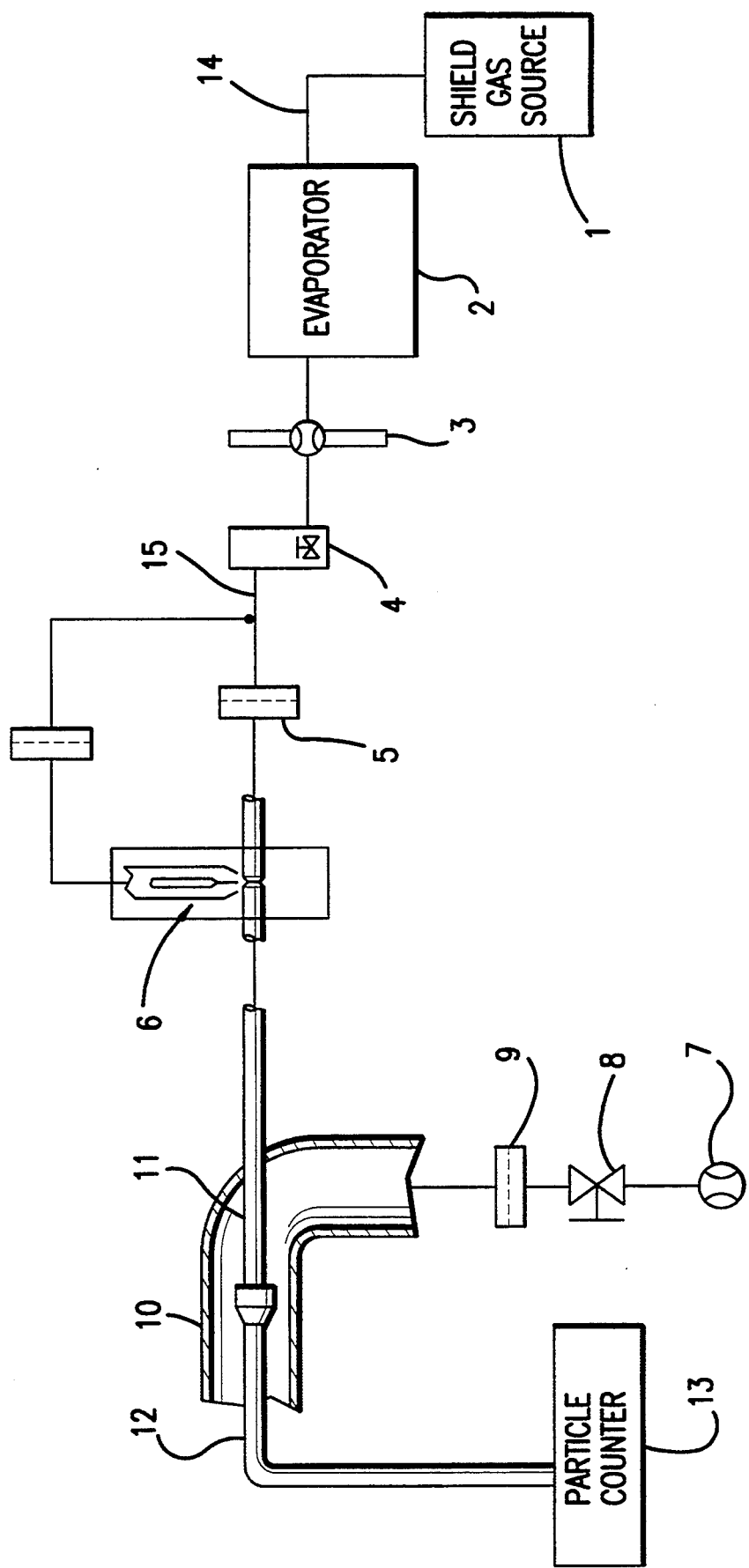
FIG. 1 is a schematic diagram of an apparatus for practicing the invention and including apparatus for measuring the number of particles entering the welded pipes.
Figure 2:
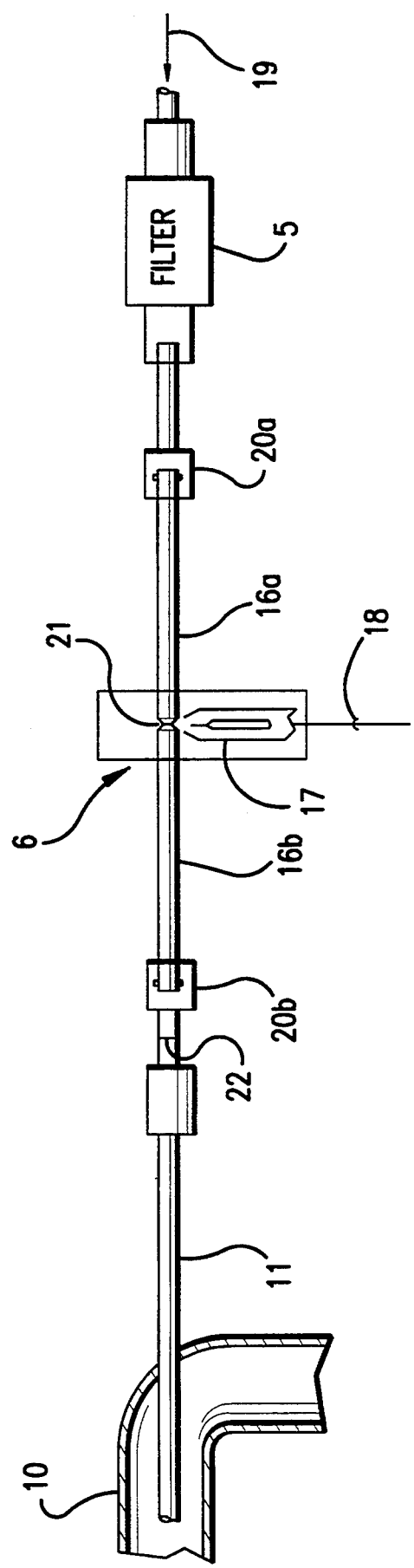
FIG. 2 is a schematic view illustrating further detail of the apparatus of FIG. 1.

As illustrated in FIGS. 1 and 2, apparatus for arc welding according to the present method includes an arc welder 6. The welder 6 may be an automatic welder such as the Arc Machine Company model 107-4A automatic TIG welder. This welder includes a tungsten electrode 17 (point angle $\alpha=15°$; diameter 1.0 mm). The electrode is rotated around the pipes 16a, 16b which are to be welded. The rate of rotation may be 7.9 seconds per rotation with the electrode making 2.5 turns during the welding operation. The Arc Machine Company welder permits the adjustment of welding current at four stages.

A suitable arc gas 18, such as argon, is supplied to the welder from a source not shown at a flow rate of 8 L/min. A back shielding gas 19 is supplied to one end of pipe 16a at a flow rate of 5–6 L/min from a suitable source 1 which may be a container of liquified argon. Source 1 is connected through a stainless steel flexible tube 14 (d=9.52 mm) an aluminum evaporator 2, a manifold pressure reducing valve 3, a flow meter 4, a stainless steel tube 15 (d=6.35 mm) and a metal type filter 5 to one end of pipe 16a. An O-ring type seal joint 20a (FIG. 2) couples the output line from filter 5 to the end of pipe 16a. The metal filter 5 and a further filter (not shown) in the arc welder 6 filter the back shielding gas 19 and arc gas 18 so that the number of particles in these gases is almost zero.

An orifice 22 (FIG. 2) of electropolished stainless sheet steel is disposed in the vicinity of the connection between a stainless steel gas lead-through pipe 11 (d=6.35 mm) and the pipe 16b. The orifice 16 serves to restrict the discharge of back shielding gas 19. A valve may be used instead of orifice 22 to restrict the flow of back shielding gas away from the welding site. One end of lead-through pipe 11 is connected to one end of pipe 16b by an O-ring type seal joint 20b and at the other end the lead-through pipe extends into an open end of a stainless steel lead-through pipe 12 (d=9.52 mm). Pipe 12 is connected to the intake of a laser particle counter 13 which may be a type TS-3700 made by Hitachi Denshi Ltd. This counter has a rated suction flow rate of 28.3 L/min. The counter has seven measuring channels, 6 channels for counting the number of particles falling within six ranges of sizes from 0.1 $\mu$m to greater than 2.0 $\mu$m and one channel for counting the total number of particles counted by the other six channels.

A stainless steel external pipe 10 (d=19.05 mm) surrounds the region where pipe 11 enters pipe 12. Nitrogen gas is supplied to pipe 10 from a source (not shown) at a rate of 50 L/min so that the particle counter may suck gas at its rated flow rate. The nitrogen gas is supplied to pipe 10 through a pressure reducing valve 7, a flow control valve 8 and a filter 9.

With an apparatus set-up as described above, two stainless steel (SUS 316L) pipes 16a, 16b having inner wall surfaces polished by electrolysis were welded as follows. The pipes, having an outer diameter of 6.35 mm and a wall thickness (40 L/min) of 1 mm were cut and machined under a nitrogen gas purge to have flat end surfaces with slightly chamfered peripheral edges. The insides of the pipes were then purged with nitrogen gas at 7–9.5 kg/cm$^2$ and then set into the head of the automatic welder so that the chamfered edges formed a weld groove 21. The arc distance between electrode 17 and groove 21 was set to 0.8 mm.

In the welding process it is essential that the chamfered edges be accurately matched by aligning the centers of pipes 16a, 16b so that there will be minimal leakage of the back shielding gas.

When the automatic welder is started it sucks in arc gas 18 at a rate of 8 L/min for 20 seconds. The welding power source is then turned on and starts the welding arc. About 2 seconds after the start of arc the welder starts rotations of the electrode 17. After the electrode makes about 2.5 turns at a rate of 7.7 sec/rotation the arc is terminated. Post purging of arc gas for 18–20 seconds at a flow rate of 8 L/min completes the welding operation.

Figure 3:
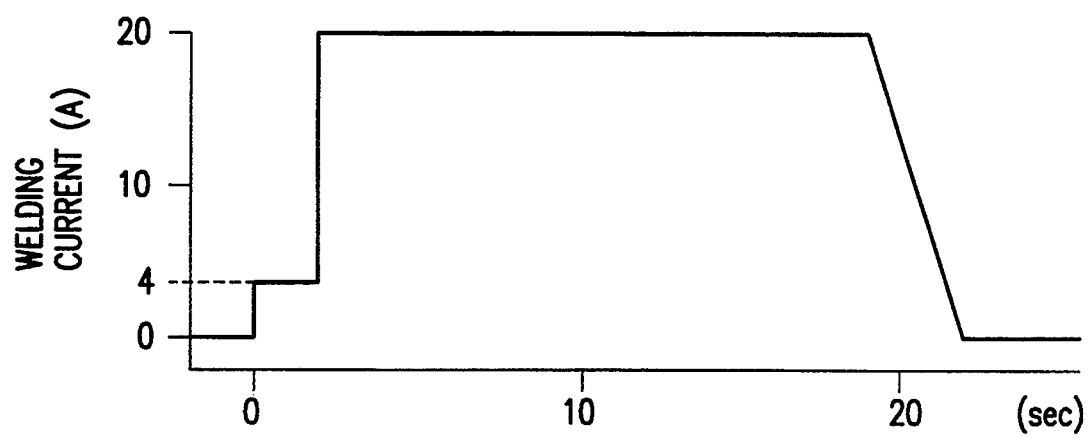
FIG. 3 is a graph illustrating the variation in welding current as a function of time according to the present welding method; and, FIG. 4 is a graph illustrating the variation in welding current as a function of time according to a welding method of the prior art.

FIG. 3 shows the variation of the welding current I applied during welding. According to the present invention, the welding current applied to start the arc at t=0 is about 4A or 1/5 of the regular welding current for the Arc Machine Company model 107-4A automatic welder. This starting current is maintained for about 2 seconds and then raised to the regular welding current of 20 A for about 17 seconds. The welding current is then gradually lowered to zero over a 3-second interval.

For the welder used, the welding current for starting the arc should be in the range of 10–30% of the normal welding current. If the welding current for starting the arc exceeds 30% of the normal welding current, the arc immediately begins melting the pipe metal and a clearance is generated in the groove 21. If the starting current is less than 10%, or drops to less than 10%, the arc itself may be unstable.

The optimum period for maintaining the reduced current is to 3 seconds. If the reduced current is maintained for longer than 3 seconds the resulting weld is of slightly poorer quality. On the other hand, if normal welding current is applied to start the arc, or is applied too soon after the arc is initiated, the force of plasma flow generated the moment the arc is produced, blows dust generating particles into the welding head so that a large number of particles enter the pipes.

During welding of pipes 16a, 16b, back shielding gas 19 was fed into one pipe at a flow rate of 5 L/min. It is desirable to hold the flow rate of the back shielding gas in the range of 3–7 L/min. In addition, if the internal pressure of the pipes can be raised, it is desirable to hold the internal pressure of the pipes at about 3–100 mm (H$_2$O). This can be accomplished by inserting an orifice, such as orifice 22, in the pipe downstream of the weld site from where the back shielding gas is applied.

To obtain an accurate count of dust particles produced by the welding process, welding was carried out in a clean room wherein the number of particles exceeding 0.1 $\mu$m in size was less than one per cubic foot. The laser particle counter was started 5 minutes before the start of welding (arc gas 18 being sucked into the welder and back shielding gas being supplied) and the measurement continued until 5 minutes after completion of the weld. In addition, from the measurement output of the counter, the output range corresponding to the measurement output during the welding process was identified (output range from start to completion of welding), and the number of particles counted during the period was calculated.

A first series of four tests was conducted using the apparatus of FIGS. 1 and 2 and a welding current as shown in FIG. 3, the back shielding gas flow rate was 5 L/min and the internal pipe pressure maintained at 5 mm (H$_2$O). During the four tests, the number of particles exceeding 0.1 μm detected by the particle counter was 36, 3, 11 and 88, respectively.

Figure 4:
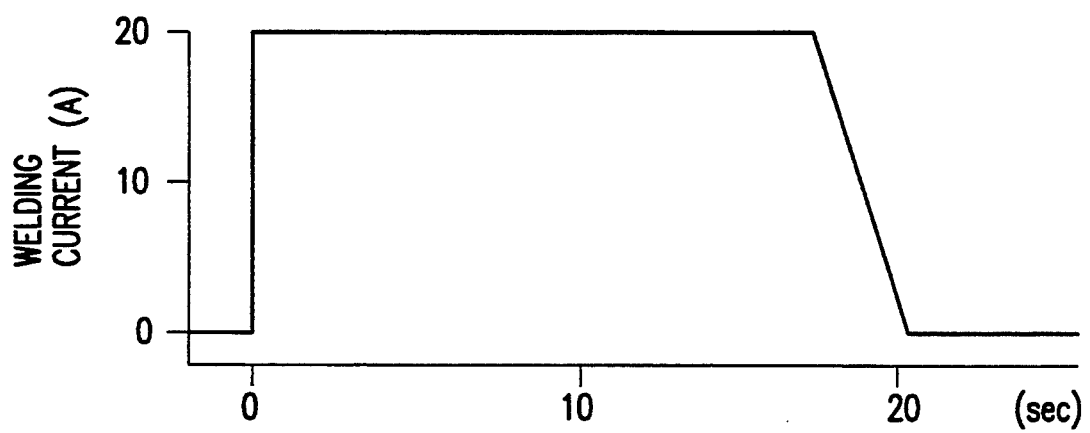

For purposes of comparison, a second series of three tests was conducted with all test conditions being the same as for the first series except that a full welding current of 20A was applied to start the arc (FIG. 4). Rotation of the electrode 17 was begun 2 seconds after the start of arc as in the first series of tests. During the three tests, the number of particles greater than 0.1 mm counted by the particle counter was 286, 638 and 228, respectively.

Since all conditions in both series of tests remained the same except for the magnitude of the current for starting the arc, it is clear that the present invention can greatly reduce the number of particles generated at a weld. As compared to the prior art, smoother inner and outer weld surfaces are produced by practicing the present invention.

Although butt welding of stainless steel pipes has been described for the purpose of illustrating the present invention, it has been confirmed that the number of particles generated during welding can be greatly reduced when the welding process of the invention is utilized to weld joints with lips or tube type joints. The invention is equally advantageous in welding titanium alloys or other metals and is not limited in its use to the welding of stainless steel.

While specific currents and gas flow rates have been specified in the foregoing description to illustrate an operative apparatus for practicing the invention, it will be understood that these parameters will vary according to the specific welding apparatus employed.

We claim:
1. A welding process for arc welding two stainless steel pipes, said process comprising:
   placing said pipes in an abutting relationship in an automatic TIG welder using argon as an arc gas;
   starting an arc in the arc welder with a welding current less than that required to cause fusion of stainless steel while flowing an argon back shielding gas into an end of one of said pipes wherein the internal pressure of said pipes is maintained at 3–120 mm($H_2O$) by said argon back shielding gas from a time prior to start of said arc until a time after the welding of said pipes is completed; and
   increasing said welding current to a magnitude corresponding to the normal welding current of the automatic TIG welder and sufficient to cause fusion of stainless steel, said welding current being increased after a lapse of an interval of time of 1 to 3 seconds measured from the start of said arc.

2. A welding process as claimed in claim 1 wherein said welding current insufficient to cause fusion of said pipes is 20–30% of the welding current of said magnitude corresponding to the normal welding current of said automatic TIG welder.

3. A welding process as claimed in claim 1 wherein the internal pressure in the pipes is maintained at 3–120 mm($H_2O$) by restricting the discharge of the argon back shielding gas with an orifice or valve.

4. A welding process as claimed in claim 1 wherein rotation of an electrode of the automatic TIG welder is started about 2 seconds after the start of arc.

* * * * *